United States Patent
Maffeis

(10) Patent No.: US 7,475,927 B2
(45) Date of Patent: Jan. 13, 2009

(54) EXPANDABLE FINGER GRIPPER

(75) Inventor: Giuseppe Maffeis, Roncadelle (IT)

(73) Assignee: GIMATIC S.p.A, Brescia (IT)

( * ) Notice: Subject to any disclaimer, the term of this patent is extended or adjusted under 35 U.S.C. 154(b) by 0 days.

(21) Appl. No.: 11/686,536

(22) Filed: Mar. 15, 2007

(65) Prior Publication Data
US 2007/0222245 A1 Sep. 27, 2007

(30) Foreign Application Priority Data
Mar. 27, 2006 (IT) .................... 2006 A 000071

(51) Int. Cl.
*B25J 15/00* (2006.01)
(52) U.S. Cl. .................... 294/93; 294/88; 294/100; 279/2.17
(58) Field of Classification Search .................... 294/93, 294/98.1, 88, 63.2, 86.24, 100; 279/2.17, 279/2.22
See application file for complete search history.

(56) References Cited

U.S. PATENT DOCUMENTS

| | | | | |
|---|---|---|---|---|
| 3,052,494 A | * | 9/1962 | Williamson | 294/93 |
| 3,134,620 A | * | 5/1964 | Blaisdell | 294/88 |
| 4,168,073 A | * | 9/1979 | LaRue | 279/2.09 |
| 4,173,368 A | * | 11/1979 | Haverbusch | 294/88 |
| 4,770,456 A | * | 9/1988 | Phillips et al. | 294/93 |
| 5,201,838 A | * | 4/1993 | Roudaut | 294/88 |
| 5,282,888 A | * | 2/1994 | Fukawa et al. | 118/500 |
| 5,322,300 A | * | 6/1994 | Mistrater et al. | 279/2.17 |
| 6,318,779 B1 | * | 11/2001 | Hanne et al. | 294/88 |

* cited by examiner

*Primary Examiner*—Dean J Kramer
(74) *Attorney, Agent, or Firm*—McGlew & Tuttle, P.C.

(57) ABSTRACT

A pneumatically controlled finger gripper having a supporting body (11) with a proximal and a distal end, a pneumatic control piston (12) guided and moving alternatively in the body, a compression disk (13) connected to, and moving axially with, the piston relatively at the distal end of the supporting body, and a flexible gripper element (14) assembled between the compression disk (13) and the distal end of the supporting body (11) and moving between a contracted and expanded position in response to the movements of the control piston with the compression disk between an inactive and active position.

4 Claims, 3 Drawing Sheets

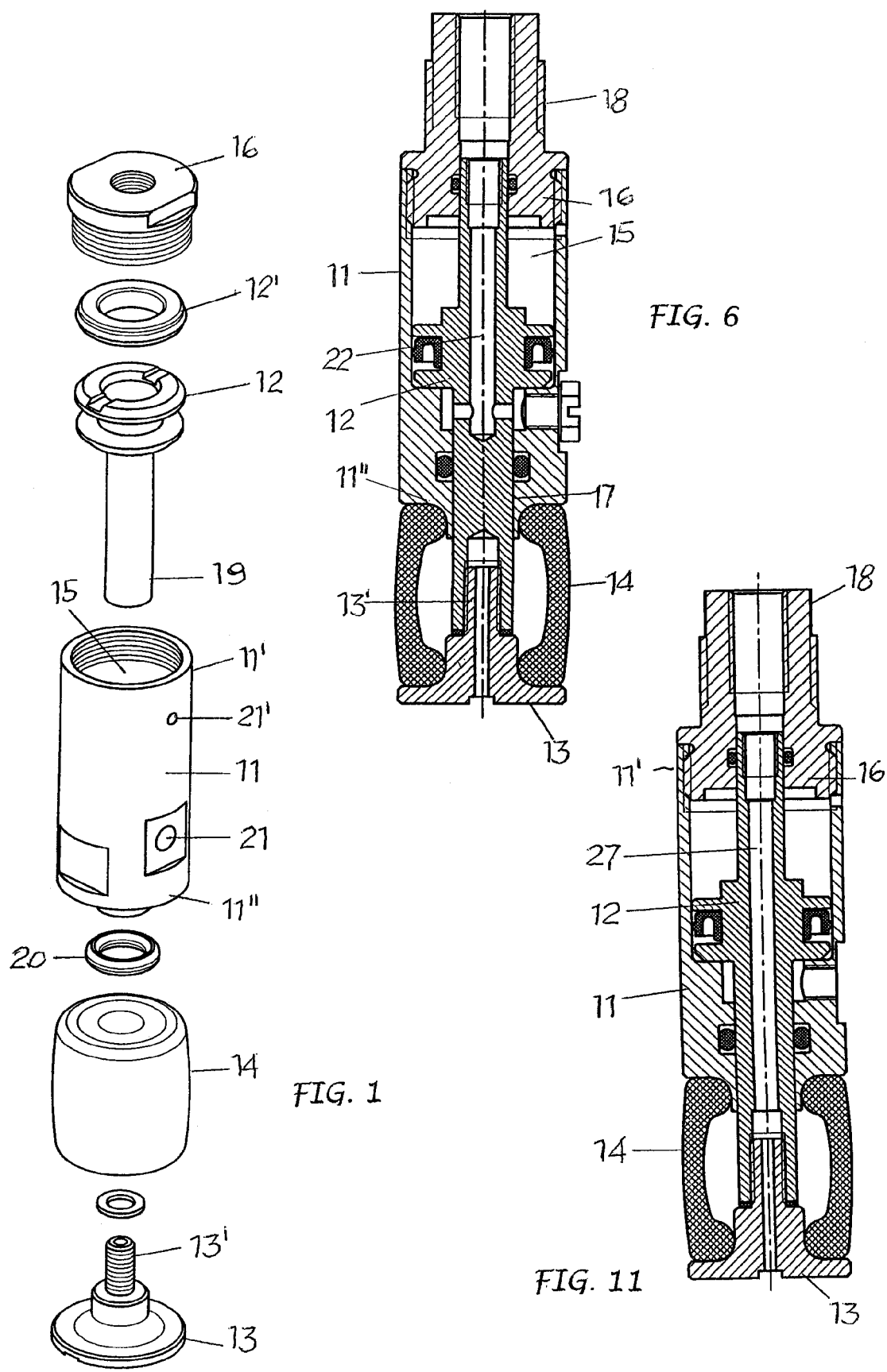

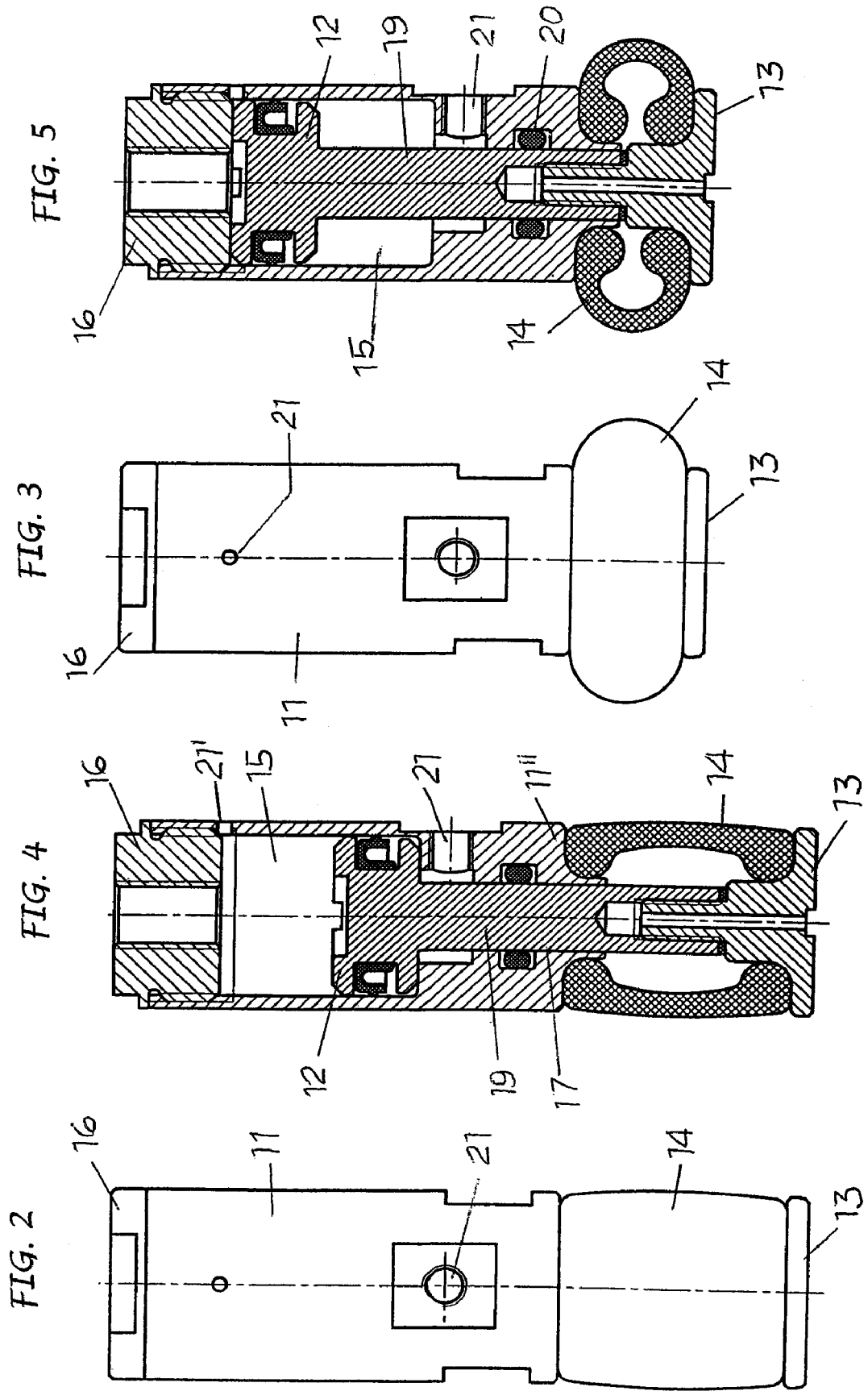

EXPANDABLE FINGER GRIPPER

FIELD OF THE INVENTION

This invention concerns in general means for gripping items, objects or containers, and refers in particular to a pneumatically controlled expandable gripper

STATE OF THE TECHNIQUE

Among the means for gripping and handling items while carrying out their production processes and/or when being used, an inflatable finger gripper is already well known. It comprises an almost tubular gripper element, made of an elastomer material such as silicone, bent to form two concentric walls, the edges of which are linked, by means of tightening rings, to the supporting body so as to form an annular chamber. The gripping element is usually in a contracted position; as such it can be inserted into the cavity of the body to be picked up, after which air under pressure is blown into the chamber, through a passage provided in the body support, to swell the element and expand it so that it grips the item.

Such a finger however has some drawbacks which the technicians in the sector are well aware of. In fact, it operates at a relatively low pressure so that its gripping force is not able to exceed certain limits. The working pressure must be in proportion to the thickness of the walls of the inflatable element and if not limited to its maximum value could cause the element to explode and subsequently the breakdown of the finger gripper. Consequently, to avoid this possibility each inflatable finger must also be equipped with a pressure adjustor, thus further increasing the weight of the tool, it being already cumbersome in that it has a solid and heavy body. Furthermore, when worn or broken, the inflatable gripper cannot be replaced so this means that the whole finger must be discarded.

OBJECTIVE AND SUMMARY OF THE INVENTION

One objective of this invention is to propose a pneumatically controlled finger gripper, but expandable by means of mechanical devices, starting from a contracted position and appropriate to fully avoid the limitations and disadvantages of the inflatable finger of the well known technique.

Such an objective is achieved according to the invention with a finger gripper characterised by a supporting body, a pneumatic control piston positioned and moving alternately in said body, a compression disk connected and movable axially with the piston, and a flexible gripper component positioned between said disk and body and movable between a contracted and an expanded position in response to the movements of the piston when moving between an inactive and an active position.

Advantageously, thanks to this type of configuration, the finger gripper is much simpler, lighter and less costly also due to the fact that it has a flexible and expandable gripper component and not an inflatable one. This gripper element can now be much thicker, consequently more robust, have greater wear resistance, and have a longer and more efficient life span. Above all it can be easily replaced without having to substitute or eliminate any other component of the tool. Where required, the flexible element of the gripper can also be provided with a profiled surface, such as for example corrugated, so as to offer not one but several grip areas.

Furthermore, the tool is able to function using even very considerable pressure levels, in any case not limited, in order to be able to develop even higher forces in that the flexible gripper element is neither filled or directly subjected to the thrust of air under pressure so that there is no risk of it exploding. This also means there is no need for a pressure regulator, also costly, on board the tool, as is, on the other hand, required in the abovementioned finger gripper whose technique is well known.

Furthermore, the gripper component is contracted and expanded by means of mechanical components, whose position is always perfectly detectable, even electronically by means of positioning sensors. Therefore the stroke of the control piston will be possible to control at any time, and through this the degree of expansion of the gripper component so as to vary and establish the gripper force on the items to be handled, depending on their fragility, weight, etc.

It should be noted that the tool of the invention could be designed and used, not only as a gripper element, but also as a means for testing the sealing capacity of hollow bodies or containers. In this case, the tool can be used like a bung to hermetically close a cavity and equipped with a conduit suitable for blowing air into said cavity, placing it under pressure to check for possible leaks, or, on the contrary, to remove air from the cavity, creating a vacuum to check for possible cracks or breakage of the object.

BRIEF DESCRIPTION OF THE DRAWINGS

Further details of the invention will become more evident from the following description made in reference to the enclosed indicative and not binding drawings, in which:

FIG. 1 shows a blow-up of a function mode of the finger gripper according to the invention;

FIGS. 2 and 3 show an external view of the assembled tool with the gripper element in the contracted and expanded position respectively;

FIGS. 4 and 5 show a longitudinal section of the tool with the gripper element in the contracted and expanded position respectively;

FIG. 6 shows a variation in construction of the tool, in which the command fluid is fed through an axial conduit in the piston;

FIG. 11 shows the section of a tool corresponding to the one in FIG. 6 but equipped with a through axial conduit for it use in pressurising or creating a vacuum in a cavity.

DETAILED DESCRIPTION OF THE INVENTION

Figure 10:
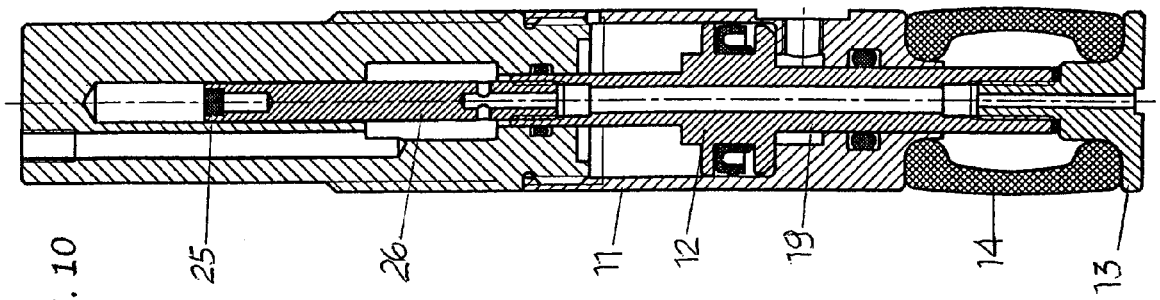
FIGS. 9 and 10 show, respectively, and external view and an enlarged longitudinal section of the tool equipped with position sensors.

As shown, the finger gripper proposed here basically comprises, a supporting body 11, a pneumatic control piston 12, a compression disk 13 and an expandable gripper element 14.

The supporting body 11, that can be cylindrical, has a proximal end 11' and a distal end 11" and forms internally a chamber 15 closed by a plug 16 on the proximal end and having an end bore 17 on the distal end. At its proximal end, the supporting body 11, or even its plug 16, has a connection or fitting 18—FIGS. 6, 11—to connect the finger gripper to a manipulator—not shown.

The control piston 12 is seal housed with a relative seal 12' and moves in the chamber 15. It has a rod 19, which extends into the end bore 17 with the interposition of a seal 20 and which protrudes from the distal end of said body. The compression disk 13 is connected to the end of the rod 19 of the piston 12 by means of, for example, a threaded shank 13'.

The expandable gripper element 14 is basically tubular and made of a flexible material, such as rubber, polyurethane, silicon or similar. It is initially configured with a convex barrel shaped wall acting as a receptacle for its expansion towards the external. The external surface of said gripper element 14 can be continuous, that is, uniform or it can be shaped or corrugated. It is, however, assembled between the compression disk 13 and the distal end of the supporting body 11, around the connecting area of the piston rod with the compression disk.

The control piston 12, together with the compression disk 13, is movable between a forward, inactive position, where it is moved in the chamber 15 towards the distal end of the supporting body 11 and the flexible gripper element 14 is relaxed and contracted, and a retracted, active position, when it is moved towards the proximal plug 16 and the flexible gripper element 14 is expanded, lodged between the compression disk 13 and the supporting body 11—FIGS. 4, 5 and 7, 8.

The control piston 12 is and normally remains in the inactive position due to the innate flexibility of the gripper element 14 and/or with the help of a possible return spring—not shown—placed between the piston and the proximal plug 16. The control piston 12 is on the contrary, moved into the active position feeding a fluid under pressure, usually air, to the chamber 15 through a feed hole 21 provided in a radial position in the supporting body or by means of a longitudinal conduit 22—FIG. 6—provided in the proximal plug and in the piston itself. Where necessary, the chamber 15 may also be provided with a bleeder 21'.

Clearly, when contracted, the gripper element can be inserted into the cavity of an object or container that is to be handled. Then, by feeding a fluid under pressure to the chamber 15, the piston is moved backwards together with the compression disk 13, causing the gripper element to expand so as to fit tightly in the cavity it is inserted into in order to be able to reliably handle the object or container in question.

Figure 9:
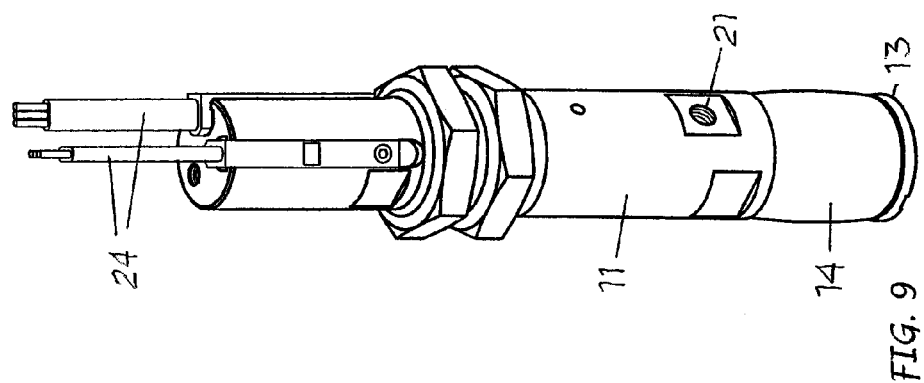
Figure 8:
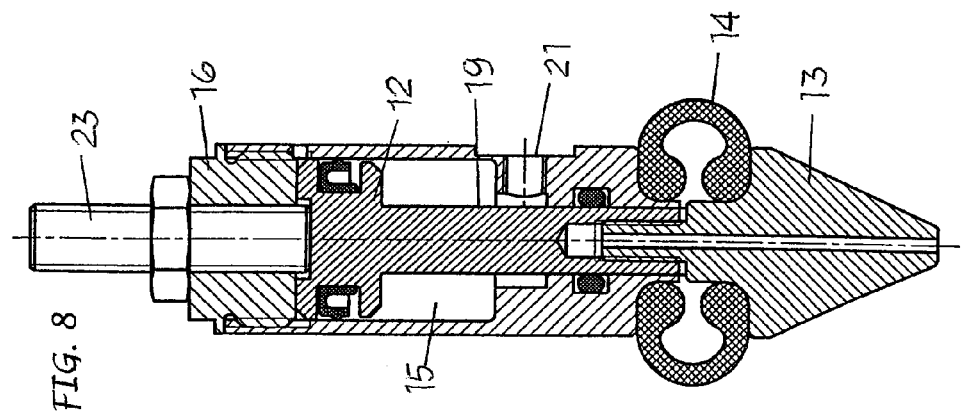
FIGS. 7 and 8 show a longitudinal section of the tool with the gripper element in the contracted and expanded position respectively, equipped with a end of stroke stop and a modified compression disk.
Figure 7:
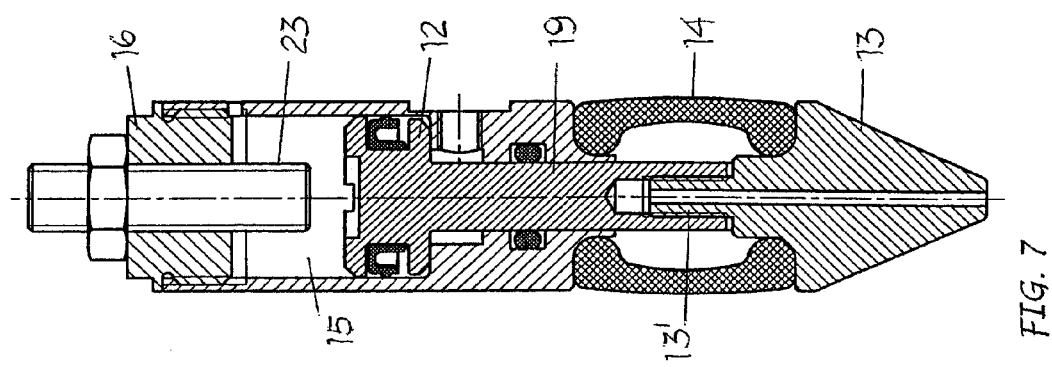

It should be noted that the backward stroke of the piston 12 inside the relative chamber 15 can be limited and adjusted by means of a mechanical stop device 23 applied to the proximal plug 16, being able in this way to vary, as required, the expansion level of the flexible gripper element 13. As an alternative, the piston stroke in the relative chamber, and in association with the expansion level of the flexible gripper element, can be controlled and managed by electronic sensors 24 associated with the supporting body 11 and interacting with a magnetic element 25 placed on board the piston or shaft 26 it is connected to—FIGS. 9 and 10. The compression disk 13 can be flat or conical as shown in FIGS. 7 and 8 to facilitate in this case the insertion into the cavity of the object or container to be handled.

The tool can also be equipped with a through axial passage 27 which passes through the proximal plug, the piston and relative rod and the compression disk as shown in FIG. 11, and to which is connectable, alternatively according to requirements, an air under pressure feed pipe or a suction pipe. In this case, after the tool has been blocked, by the expansion of the flexible gripper element in the cavity of an object or container, it will be possible to pressurise or respectively depressurise the internal of said object or container to test its sealing capacity or leakage.

Lastly it should be noted that the finger gripper of the invention, besides gripping and handling objects or containers from the inside of a cavity, it can be used, in combination with at least one other similar finger gripper or complementary jig, also to engage and handle objects and bodies from the outside.

The invention claimed is:

1. A pneumatically controlled finger gripper, the finger gripper comprising:
   a supporting body having a proximal end and a distal end, said supporting body having a radially extending supporting body portion and an axially extending supporting body portion at said distal end;
   a pneumatically controlled piston guided in said body, said piston being movable alternatively in said body;
   a compression disk connected to, and moving axially together with said piston relatively with the distal end of said supporting body, said compression disk having a radially extending compression disk flange portion, said compression disk flange portion having an inner flange surface;
   a proximal plug; and
   a flexible gripper element located between said compression disk and said distal end of the supporting body, said gripper element being in contact with said radially extending supporting body portion and said axially extending supporting body portion and said inner flange surface of said compression disk, said gripper element moving between a contracted position and an expanded position when the piston with the compression disk moves between an inactive position and an active position, said supporting body defining a chamber, said chamber being fed by a fluid under pressure for the movement of the control piston from said inactive position to said active position, said inactive position being maintained by the flexible gripper element positioned between the piston and said proximal plug.

2. A pneumatically controlled finger gripper, the finger gripper comprising:
   a supporting body having a proximal end and a distal end, said supporting body having a radially extending supporting body portion and an axially extending supporting body portion at said distal end;
   a pneumatically controlled piston guided in said body, said piston being movable alternatively in said body;
   a compression disk connected to, and moving axially together with said piston relatively with the distal end of said supporting body, said compression disk having a radially extending compression disk flange portion, said compression disk flange portion having an inner flange surface;
   a proximal plug; and
   a flexible gripper element located between said compression disk and said distal end of the supporting body, said gripper element being in contact with said radially extending supporting body portion and said axially extending supporting body portion and said inner flange surface of said compression disk, said gripper element moving between a contracted position and an expanded position when the piston with the compression disk moves between an inactive position and an active position, said supporting body defining a chamber, said chamber being fed by a fluid under pressure for the movement of the control piston from said inactive position to said active position, said inactive position being maintained by the flexible gripper element positioned between the piston and said proximal plug, said supporting body having a radial bore to feed the fluid under pressure into said chamber to move the control piston from the inactive to the active position.

3. A pneumatically controlled finger gripper, the finger gripper comprising:
- a supporting body having a proximal end and a distal end, said supporting body having a radially extending supporting body portion and an axially extending supporting body portion at said distal end;
- a pneumatically controlled piston guided in said body, said piston being movable alternatively in said body, said control piston comprising a piston rod;
- a compression disk connected to, and moving axially together with said piston relatively with the distal end of said supporting body, said compression disk having a radially extending compression disk flange portion, said compression disk flange portion having an inner flange surface;
- a proximal plug; and
- a flexible gripper element located between said compression disk and said distal end of the supporting body, said gripper element being in contact with said radially extending supporting body portion and said axially extending supporting body portion and said inner flange surface of said compression disk, said gripper element moving between a contracted position and an expanded position when the piston with the compression disk moves between an inactive position and an active position, said supporting body defining a chamber, said chamber being fed by a fluid under pressure for the movement of the control piston from said inactive position to said active position, said inactive position being maintained by the flexible gripper element positioned between the piston and said proximal plug, said control piston having a longitudinal conduit with an inlet facing towards the proximal plug and an outlet on a level with the piston rod to feed the fluid under pressure into said chamber to move the control piston from the inactive to the active position.

4. A pneumatically controlled finger gripper, the finger gripper comprising:
- a supporting body having a proximal end and a distal end, said supporting body having a radially extending supporting body portion and an axially extending supporting body portion at said distal end;
- a pneumatically controlled piston guided in said body, said piston being movable alternatively in said body, said piston comprising a rod;
- a proximal plug;
- a compression disk connected to, and moving axially together with said piston relatively with the distal end of said supporting body, said compression disk having a radially extending compression disk flange portion, said compression disk flange portion having an inner flange surface; and
- a flexible gripper element located between said compression disk and said distal end of the supporting body, said gripper element being in contact with said radially extending supporting body portion and said axially extending supporting body portion and said inner flange surface of said compression disk, said gripper element moving between a contracted position and an expanded position when the piston with the compression disk moves between an inactive position and an active position, wherein a through passage is defined in said proximal plug, said piston and said rod and said compression disk for connecting to an air under pressure feed pipe or a suction pipe to use the finger gripper to pressurize or create a vacuum in a container.

* * * * *